US010288887B2

(12) United States Patent
Pan et al.

(10) Patent No.: US 10,288,887 B2
(45) Date of Patent: May 14, 2019

(54) HEAD-MOUNTED DISPLAY DEVICE

(71) Applicant: Coretronic Corporation, Hsin-Chu (TW)

(72) Inventors: Haw-Woei Pan, Hsin-Chu (TW); Yi-Hsuang Weng, Hsin-Chu (TW); Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/927,099

(22) Filed: Mar. 21, 2018

(65) Prior Publication Data
US 2018/0284450 A1 Oct. 4, 2018

(30) Foreign Application Priority Data

Mar. 31, 2017 (CN) .......................... 2017 1 0206151

(51) Int. Cl.
*G02B 27/01* (2006.01)
*G02B 27/14* (2006.01)
(52) U.S. Cl.
CPC ..... *G02B 27/0172* (2013.01); *G02B 27/0176* (2013.01); *G02B 27/145* (2013.01)
(58) Field of Classification Search
CPC ............ G02B 27/0172; G02B 27/0176; G02B 27/145
USPC ........................................................ 345/7–9
See application file for complete search history.

(56) References Cited

U.S. PATENT DOCUMENTS

| 5,467,104 A | 11/1995 | Furness, III et al. |
| 5,701,132 A | 12/1997 | Kollin et al. |
| 6,057,966 A | 5/2000 | Carroll et al. |
| 6,157,352 A | 12/2000 | Kollin et al. |
| 6,829,095 B2 | 12/2004 | Amitai |
| 7,457,040 B2 | 11/2008 | Amitai |
| 7,719,769 B2 | 5/2010 | Sugihara et al. |
| 8,520,310 B2 | 8/2013 | Shimizu |
| 8,666,212 B1 | 3/2014 | Amirparviz |

(Continued)

FOREIGN PATENT DOCUMENTS

| CN | 103399404 | 11/2013 |
| CN | 104216042 | 12/2014 |

OTHER PUBLICATIONS

Eunkyong Moon, et al., "Holographic head-mounted display with RGB light emitting diode light source," Optics Express, vol. 22, Issue 6, Mar. 2014, pp. 6526-6534.

(Continued)

*Primary Examiner* — Michael Pervan
(74) *Attorney, Agent, or Firm* — JCIPRNET

(57) ABSTRACT

A head-mounted display device including a display and a beam combiner is provided. The display is configured to emit an image bean, and the beam combiner includes a plurality of stacked light-splitting layers. The light-splitting layers include a first light-splitting layer and a second light-splitting layer. The image beam is adapted to enter and exit the beam combiner through the first light-splitting layer. The first light-splitting layer is located between the second light-splitting layer and the display. The beam combiner satisfies $0.7 \le R1/(T1 \times R2 \times T1) \le 1.3$. Here, R1 is light reflectivity of the first light-splitting layer, T1 is light transmittance of the first light-splitting layer, and R2 is light reflectivity of the second light-splitting layer. The head-mounted display device provided herein has advantages of usage convenience and compactness.

10 Claims, 4 Drawing Sheets

(56) References Cited

U.S. PATENT DOCUMENTS

| | | |
|---|---|---|
| 8,796,087 B2 | 8/2014 | Kim et al. |
| 8,836,844 B2 | 9/2014 | Hiasa et al. |
| 9,239,462 B2 | 1/2016 | Takeda et al. |
| 2010/0053729 A1 | 3/2010 | Tilleman et al. |
| 2010/0079865 A1 | 4/2010 | Saarikko et al. |
| 2010/0149073 A1 | 6/2010 | Chaum et al. |
| 2011/0012874 A1 | 1/2011 | Kurozuka |
| 2013/0100524 A1 | 4/2013 | Magarill et al. |
| 2014/0104580 A1 | 4/2014 | Tsai et al. |
| 2016/0377868 A1 | 12/2016 | Ouderkirk et al. |
| 2017/0299867 A1 | 10/2017 | Tsai et al. |
| 2018/0031841 A1 | 2/2018 | Hsieh et al. |
| 2018/0031843 A1 | 2/2018 | Pan et al. |

OTHER PUBLICATIONS

Kayvan Mirza, et al., "Key challenges to affordable see-through wearable displays: the missing link for mobile AR mass deployment," SPIE Defense, Security, and Sensing, May 2013, pp. 1-6.

HEAD-MOUNTED DISPLAY DEVICE

CROSS-REFERENCE TO RELATED APPLICATION

This application claims the priority benefit of China application serial no. 201710206151.6, filed on Mar. 31, 2017. The entirety of the above-mentioned patent application is hereby incorporated by reference herein and made a part of this specification.

BACKGROUND OF THE INVENTION

Field of the Invention

The invention relates to a display device; particularly, the invention relates to a head-mounted display device.

Description of Related Art

Near eye displays (NED) and head-mounted displays (HMD) are widely accepted as the revolutionary products of the next generation. Applications of NED technologies are divided into two categories, i.e., augmented reality (AR) technologies and virtual reality (VR) technologies. Researchers in the related fields are now committed to providing the best image quality in compliance with the requirements for light weight and slimness.

According to the basic framework of optics of implementing the AR/VR technologies through the HMD, a display image beam is emitted from a projection device and reflected by a transflective beam combiner, so as to enter a user's eyes. Meanwhile, the external environmental beam also enter the user's eyes through the beam combiner, so as to achieve display effects of the AR/VR technologies. Generally speaking, a specific observation area is defined on a propagation path of the image beam exiting the beam combiner. When the user's eyes are in the observation area, the image beam enters the user's eyes and is focused on the retina through the lenses of the eyes and generates images on the retina.

The size of the observation area usually relates to the size of the beam combiner. In a commonly-known structure of HMD, the size of the beam combiner cannot be too small, so as to ensure that the observation area of the HMD is sufficient. Therefore, the resultant HMD cannot comply with the requirement for compactness, and the external design of the HMD is compromised. By contrast, if the size of the beam combiner is reduced to comply with the requirement for compactness, the observation area will be reduced as well. To ensure the pupils of different users are in the observation area during the usage of the HMD, the HMD is usually equipped with an extra adjusting apparatus for locating the users' pupils at the observation area, and such an extra adjusting apparatus may cause inconvenience in usage.

To expand the observation area, in some commonly-known structures of the HMD, light diffusers are configured in the optical system, so as to expand the image beam and transfer the expanded image beam to the beam combiner. However, optical devices in the size corresponding to the expanded image beam are required, and thus the optical system of such HMD should be equipped with the optical devices of larger external diameters and other corresponding optical devices. The overall difficulty for designing such an optical system is thus higher.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a head-mounted display (HMD) device with advantages of usage convenience as well as compact design.

Other advantages of the invention are further explained in technical features disclosed in the invention.

An embodiment of the invention provides a HMD device including a display and a beam combiner. The display is configured to emit an image beam. The beam combiner includes a plurality of stacked light-splitting layers. The light-splitting layers include a first light-splitting layer and a second light-splitting layer. The image beam is configured to enter and exit the beam combiner through the first light-splitting layer. The first light-splitting layer is located between the second light-splitting layer and the display. The second light-splitting layer is closest to the first light-splitting layer. The beam combiner satisfies $0.7 \leq R1/(T1 \times R2 \times T1) \leq 1.3$, wherein R1 is light reflectivity of the first light-splitting layer, T1 is light transmittance of the first light-splitting layer, and R2 is light reflectivity of the second light-splitting layer.

Based on the above, embodiments of the invention include at least one of the following advantages or achieve at least one of the effects below. In the aforementioned embodiments of the invention, the beam combiner of the HMD device includes a plurality of stacked light-splitting layers. The light-splitting layers include the first light-splitting layer and the second light-splitting layer located closest to the first light-splitting layer. The image beam emitted by the display is configured to enter and exit the beam combiner through the first light-splitting layer. In the embodiments of the invention, the image beam exiting the beam combiner is expanded due to the properly designed light reflectivity and light transmittance of the light-splitting layers, so as to expand an observation area of the HMD device. In the embodiments of the invention, a user's pupils may easily be located in the observation area without using any other adjusting apparatuses for positioning the pupils in the observation area. Hence, the HMD device has the advantages of convenience and compactness. Moreover, since the HMD device provided in the invention does not require the light diffuser for expanding the image beam, the difficulty in designing the HMD device is lowered, and mass production of the HMD device is made easier.

Other features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
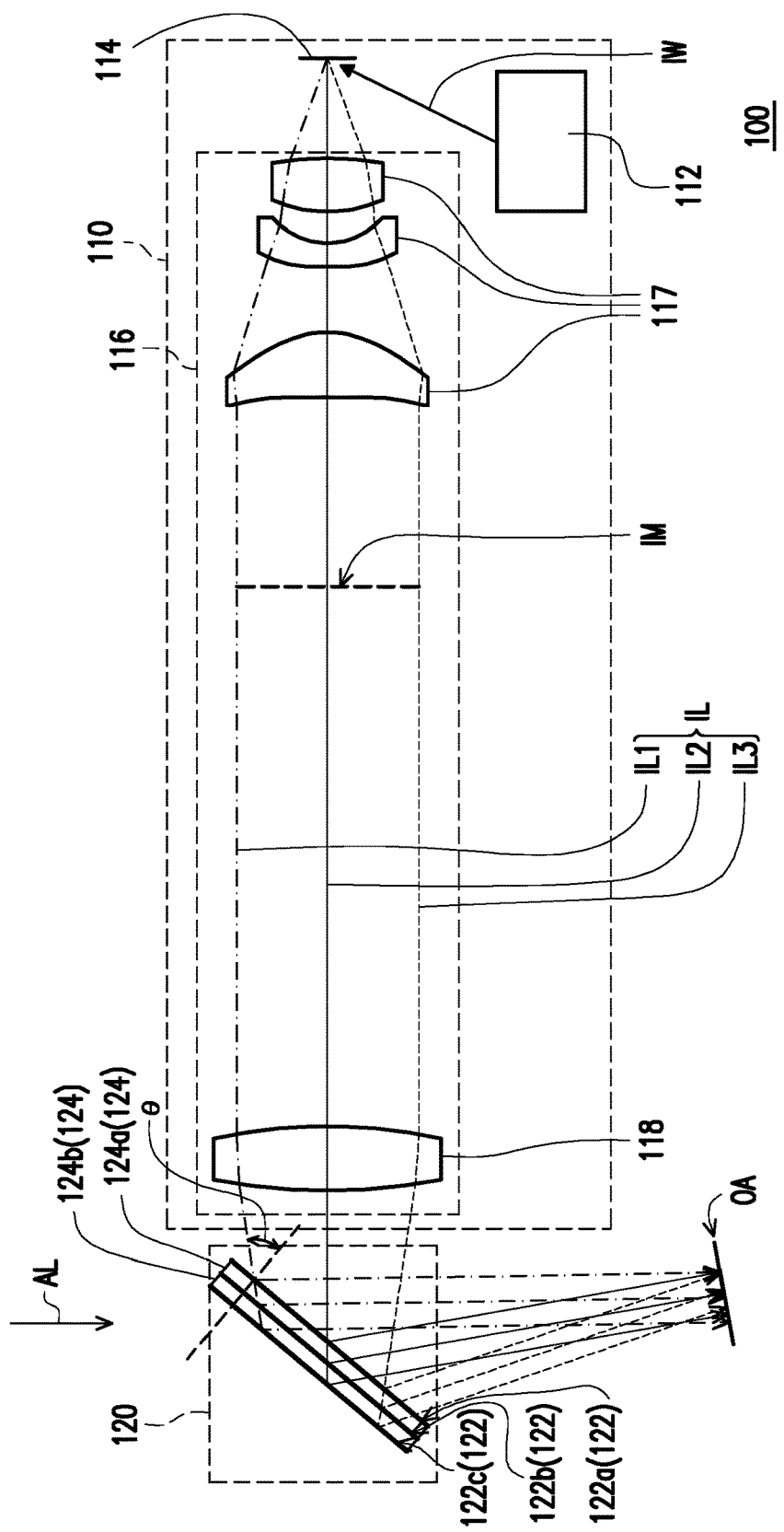
FIG. 1A is a schematic view briefly illustrating a head-mounted display (HMD) device and a portion of a propagation path of an image beam according to an embodiment of the invention.
Figure 1B:
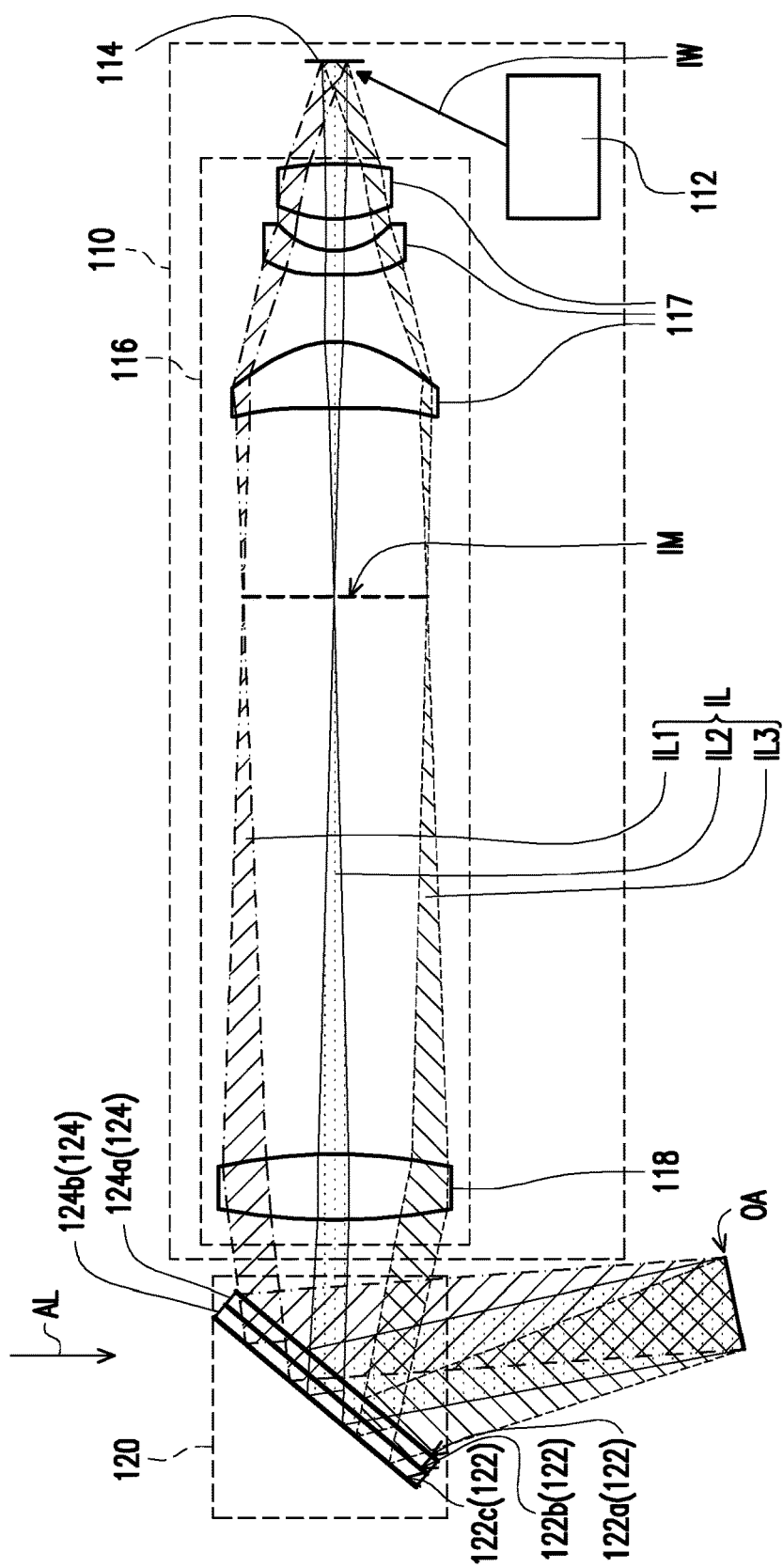
FIG. 1B is a schematic view of the propagation path of the image beam in the HMD device according to the embodiment depicted in FIG. 1A.

FIG. 1A is a schematic view briefly illustrating a head-mounted display (HMD) device and a portion of a propagation path of an image beam according to an embodiment of the invention. FIG. 1B is a schematic view of the propagation path of the image beam in the HMD device according to the embodiment depicted in FIG. 1A. FIG. 1A also depicts several parts IL1, IL2, and IL3 of an image beam IL, a portion of the image beam IL1, a portion of the image beam IL2, and a portion of the image beam IL3. The beams are, as shown in the drawings, shaped as thin threads, so as to clearly show the propagation paths of the beams. Moreover, FIG. 1B depicts an area covered by the travelling image beam IL1, the travelling image beam IL2, and the travelling image beam IL3, so as to show the effects of the expanded image beam, for example. Referring to FIG. 1A and FIG. 1B, in the embodiment of the invention, a HMD device 100 includes a display 110 and a beam combiner 120. The beam combiner 120 includes a plurality of stacked light-splitting layers 122 arranged, for example, along the same direction and stacked in parallel. The light-splitting layers 122 include a first light-splitting layer 122a and a second light-splitting layer 122b. The first light-splitting layer 122a is located between the second light-splitting layer 122b and the display 110. The second light-splitting layer 122b is, among all the other light-splitting layers 122, closest to the first light-splitting layer 122a. In the embodiment of the invention, the light-splitting layers 122 further include a third light-splitting layer 122c, and the light-splitting layers 122 are disposed in parallel. In other embodiments that are not shown in the drawings, the beam combiner 120 may merely have the first light-splitting layer 122a and the second light-splitting layer 122b. Nevertheless, the invention is not limited to the above.

In this embodiment of the invention, the display 110 is configured to emit the image beam IL. The image beam IL is configured to enter and exit the beam combiner 120 through the first light-splitting layer 122a. In this embodiment of the invention, the display 110 includes, for example, a light source module 112, a reflective device 114, and an optical adjusting module 116. More specifically, in this embodiment of the invention, the light source module 112 is, for example, one or more light emitting diodes (LEDs) or one or more laser diodes. The light source module 112 may also be a backlight module in this embodiment. Nevertheless, the invention is not limited to the above. The light source module 112 is configured to provide an illuminating beam IW. In this embodiment of the invention, the reflective device 114 is located between the light source module 112 and the optical adjusting module 116. The reflective device 114 is also located on a propagation path of the illuminating beam IW from the light source module 112. In this embodiment of the invention, the reflective device 114 is configured to convert the illuminating beam IW to the image beam IL and provide the image beam IL to the optical adjusting module 116. More specifically, in this embodiment of the invention, the reflective device 114 may be a light scanning mirror, such as a micro-electro-mechanical system (MEMS) scanning mirror or a digital micro-mirror device (DMD). Nevertheless, the invention is not limited to the above. In this embodiment of the invention, the reflective device 114 may be driven by a voltage to swing on one or two axes, so as to reflect the illuminating beam IW. Thereby, the reflective device 114 converts the illuminating beam IW to the image beam IL that contains image information.

In this embodiment of the invention, the optical adjusting module 116 is located between the light source module 112 and the beam combiner 120 and between the reflective device 114 and the beam combiner 112. The beam combiner 120 is located on a propagation path of the image beam IL from the optical adjusting module 116. More specifically, in this embodiment of the invention, the optical adjusting module 116 includes a first lens set 117 and a second lens set 118. The first lens set 117 is located between the second lens set 118 and the reflective device 114. In this embodiment of the invention, the first lens set 117 is located on a propagation path of the image beam IL from the reflective device 114. The first lens set 117 converges the image beam IL into an intermediate image IM. More specifically, in this embodiment of the invention, the intermediate image IM is located between the first lens set 117 and the second lens set 118. In this embodiment of the invention, the second lens set 118 is located on a propagation path of the image beam IL from the first lens set 117. The beam combiner 120 is located on a propagation path of the image beam IL from the second lens set 118. More specifically, in this embodiment of the invention, the image beam IL is diverged and transmitted to the second lens set 118 after the converged image beam IL passes through the location of the intermediate image IM. The image beam IL passing through the second lens set 118 is again converged by the second lens set 118 and transmitted to the beam combiner 120. In this embodiment of the invention, the first lens set 117 as shown in the drawings exemplarily has three lenses, while the second lens set 118 exemplarily has one lens. In other embodiments, however, the number of lenses or the type of the optical devices may be determined in response to the actual needs for optical adjustments of the image beam IL. The invention is not limited to the above.

In this embodiment of the invention, the beam combiner 120 includes a plurality of stacked light-transmitting structures 124. A portion of the light-splitting layers 122 is interposed between two adjacent light-transmitting structures 124 and is connected to the two adjacent light-transmitting structures 124. More specifically, in this embodiment of the invention, the light-transmitting structures 124 include a first light-transmitting structure 124a and a second light-transmitting structure 124b. In this embodiment of the invention, the first light-splitting layer 122a and the second light-splitting layer 122b are respectively located on two opposite sides of the first light-transmitting structure 124a. The second light-splitting layer 122b and the third light-splitting layer 122c are respectively located on two opposite sides of the second light-transmitting structure 124b. That is to say, in this embodiment of the invention, a portion of the light-splitting layers 122 (e.g., the second light-splitting layer 122b) is interposed between the two adjacent light-transmitting structures 124 (e.g., the first light-transmitting structure 124a and the second light-transmitting structure 124b) and is connected to the two adjacent light-transmitting structures 124 (e.g., the first light-transmitting structure 124a and the second light-transmitting structure 124b).

In this embodiment of the invention, the light-transmitting structures 124 have a planar plate shape. A material of the light-transmitting structures 124 is, for example, glass, acrylic, plastic, or another light-transmitting material. Moreover, in this embodiment of the invention, the light-splitting layers 122 are, for example, partial reflection and partial transmission type. In this embodiment of the invention, when the image beam IL is transmitted to each of the light-splitting layers 122, one portion of the image beam IL is reflected by the light-splitting layers 122, while the other portion of the image beam IL passes through the light-splitting layers 122. More specifically, in this embodiment of the invention, the light-splitting layers 122 may be, for example, layers attached to or coated on the light-transmitting structures 124. Nevertheless, the invention is not limited to the above. In other embodiments of the invention, the light-splitting layers 122 and the light-transmitting structures 124 may be light splitting plates and light transmitting plates that are respectively and independently disposed, and the invention is not limited thereto. Moreover, in this embodiment of the invention, the light-splitting layers 122 and the light-transmitting structures 124 are alternately arranged. In other words, one light-transmitting structure 124 is interposed between two adjacent light-splitting layers 122. For example, the first light-transmitting structure 124a is interposed between the adjacent first and second light-splitting layers 122a and 122b. The second light-transmitting structure 124b is interposed between the adjacent second and third light-splitting layer 122b and 122c. In some embodiments, however, there may be no light-transmitting structure 124 interposed between two adjacent light-splitting layers 122. Nevertheless, the invention is not limited to the above. Alternatively, in some embodiments, a plurality of the light-transmitting structures 124 may be interposed between two adjacent light-splitting layers 122, which should not be construed as a limitation to the invention.

In this embodiment of the invention, the image beam IL entering the beam combiner 120 is configured to be sequentially incident on the light-splitting layers 122. The light-splitting layers 122 are respectively configured to reflect a portion of the image beam IL, so as to generate a plurality of reflective beams parallel to each other (details are given below). More specifically, in this embodiment of the invention, the image beam IL enters the beam combiner 120 along a direction from the first light-splitting layer 122a to the second light-splitting layer 122b and sequentially enters the light-splitting layers 122. The image beam IL sequentially exits the light-splitting layers 122 along a direction from the second light-splitting layer 122b to the first light-splitting layer 122a to exit the beam combiner 120. In this embodiment of the invention, when a user is wearing the HMD device 100, the user's eyes are in an observation area OA, for instance. In this embodiment of the invention, the observation area OA is located on a propagation path of the image beam IL exiting the beam combiner 120. In this embodiment of the invention, the image beam IL transmitted to the observation area OA may enter the user's eyes. The image beam IL may be focused on the retina through lenses of the eyes and generate images on the retina, such that the user sees an image corresponding to the image beam IL. In other embodiments of In the HMD device 100, however, the image beam IL generates images in the observation area OA, and an image-capturing apparatus (e.g., a camera) may be arranged in the observation area to capture the images. Nevertheless, the invention is not limited to the above.

Figure 2:
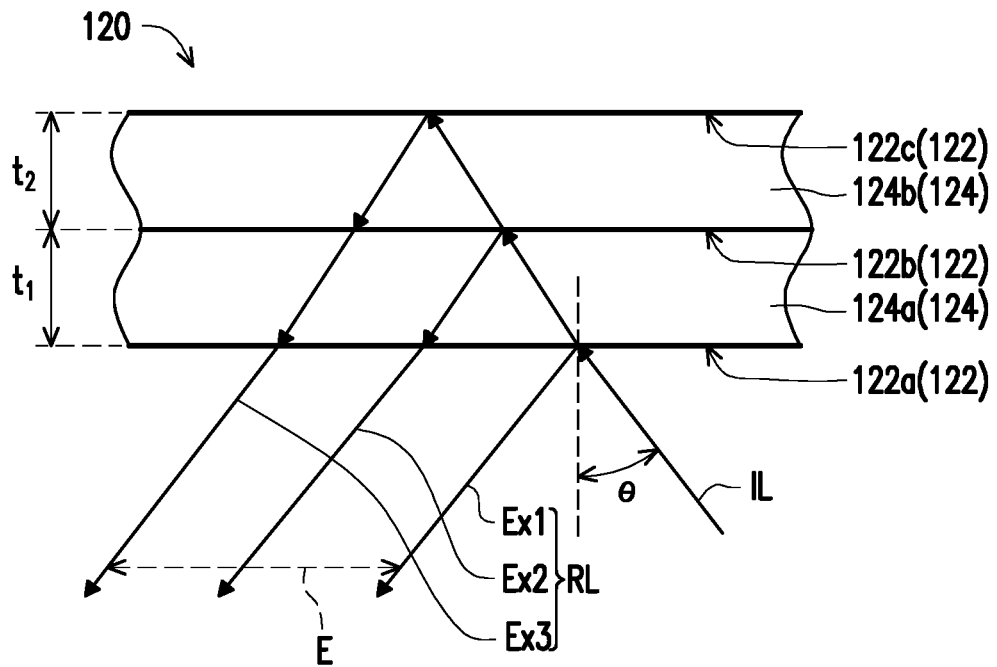
FIG. 2 is a schematic view of a propagation path of the image beam in a beam combiner according to the embodiment depicted in FIG. 1A.

FIG. 2 is a schematic view of a propagation path of the image beam in a beam combiner according to the embodiment depicted in FIG. 1A. Referring to FIG. 1A, FIG. 1B, and FIG. 2, more specifically, the beam combiner 120 is, for example, tilted with respect to an incident direction of the image beam IL from the display 110. An incidence angle θ of incidence of the image beam IL incident on the first light-splitting layer 122a is greater than 0 degree and smaller than 90 degrees. Referring to FIG. 2, in this embodiment of the invention, the portion of the image beam IL reflected by the first light-splitting layer 122a forms an exiting beam Ex1. In this embodiment of the invention, the other portion of the image beam IL passing through the first light-splitting layer 122a again passes through the first light-splitting layer 122a after reflected by the second light-splitting layer 122b, so as to form an exiting beam Ex2. In this embodiment of the invention, the portion of the image beam IL sequentially passing through the first light-splitting layer 122a and the second light-splitting layer 122b again sequentially passes through the second light-splitting layer 122b and the first light-splitting layer 122a after reflected by the third light-splitting layer 122c, so as to form an exiting beam Ex3. Thereby, in this embodiment of the invention, the image beam IL enters the beam combiner 120 through the first light-splitting layer 122a and exits the beam combiner 120 to generate the exiting beam Ex1, the exiting beam Ex2, and the exiting beam Ex3 parallel to one another. In this embodiment of the invention, the exiting beam Ex1, the exiting beam Ex2, and the exiting beam Ex3 reflected by the light-splitting layers 122 constitute an image beam (a reflective beam) RL. Based on the above, in this embodiment of the invention, compared to the image beam IL before entering the beam combiner 120, the image beam RL exiting the beam combiner 120 is expanded to a greater extent. Hence, in this embodiment, the length of the observation area OA may be effectively expanded.

As shown in FIG. 2, in this embodiment of the invention, when the first light-transmitting structure 124a has a thickness t1 and the second light-transmitting structure 124b has a thickness t2, an expanded length E of the image beam RL may be calculated by a formula below:

$$E = 2 \times t_1 \times \tan\left[\sin^{-1}\left(\frac{\sin\theta}{nd_1}\right)\right] + 2 \times t_2 \times \tan\left[\sin^{-1}\left(\frac{\sin\theta}{nd_2}\right)\right] \quad (1)$$

In this embodiment of the invention, $nd_1$ is a refractive index of the first light-transmitting structure 124a, and $nd_2$ is a refractive index of the second light-transmitting structure 124b.

Furthermore, in this embodiment of the invention, light reflectivity and light transmittance of the light-splitting layers 122 are properly designed, such that light intensities of the exiting beam Ex1, the exiting beam Ex2, and the exiting beam Ex3 generally stay identical. Thereby, when a user sees an image (not depicted here) corresponding to the image beam RL, the light intensity of the image seen by the user is evenly distributed, and thus brightness of the image is even and is not higher or lower on one side of the image. In this embodiment of the invention, the light intensity is, for example, light energy or brightness. More specifically, the light intensities of the exiting beam Ex1, the exiting beam Ex2, and the exiting beam Ex3 may be shown in the formulas below:

$$I_1 = R1 \quad (2)$$

$$I_2 = T1 \times R2 \times T1 \quad (3)$$

$$I_3 = T1 \times T2 \times R3 \times T2 \times T1 \quad (4)$$

In this embodiment of the invention, $I_1$ is the light intensity of the exiting beam Ex1, $I_2$ is the light intensity of the exiting beam Ex2, and $I_3$ is the light intensity of the exiting beam Ex3. In this embodiment of the invention, R1 is the light reflectivity of the first light-splitting layer 122a, and T1 is the light transmittance of the first light-splitting layer 122a. In this embodiment of the invention, R2 is the light reflectivity of the second light-splitting layer 122b, and T2 is the light transmittance of the second light-splitting layer 122b. In this embodiment of the invention, R3 is the light reflectivity of the third light-splitting layer 122c. In this embodiment of the invention, $I_1 = R1$, $I_2 = T1 \times R2 \times T1$, and $I_3 = T1 \times T2 \times R3 \times T2 \times T1$.

In this embodiment of the invention, the beam combiner 120 satisfies formulas below:

$$T1 > T2 > T3 \quad (5)$$

$$R1 < R2 < R3 \quad (6)$$

In this embodiment of the invention, T3 is the light transmittance of the third light-splitting layer 122c.

In this embodiment of the invention, the light transmittance and the light reflectivity of the light-splitting layers 122 may be achieved through a coating material or by adjusting parameters. In this embodiment of the invention, a ratio of the light intensity $I_1$ of the exiting beam Ex1 to the light intensity $I_2$ of the exiting beam Ex2 falls in a range from 0.7 to 1.3, such that the light intensity $I_1$ of the exiting beam Ex1 and the light intensity $I_2$ of the exiting beam Ex2 generally stay identical. That is to say, the beam combiner 120 in this embodiment satisfies a formula below:

$$0.7 \leq R1/(T1 \times R2 \times T1) \leq 1.3 \quad (7)$$

In this embodiment of the invention, R1 (i.e., the light reflectivity of the first light-splitting layer 122a) falls in a range from 3% to 17%. Nevertheless, the invention is not limited to the above. Moreover, in this embodiment of the invention, when the beam combiner 120 satisfies a formula below, the distribution of light intensity of the image may be more even to achieve better display effects:

$$0.8 \leq R1/(T1 \times R2 \times T1) \leq 1.2 \quad (8)$$

Furthermore, in this embodiment of the invention, distribution of light intensity of the image may be close to an ideal status when a ratio of the light intensity $I_1$ of the exiting beam Ex1 to the light intensity $I_2$ of the exiting beam Ex2 equals 1 or is close to 1. Similarly, in this embodiment of the invention, distribution of light intensity of the image may be close to an ideal status when a ratio of the light intensity $I_1$ of the exiting beam Ex1 to the light intensity $I_3$ of the exiting beam Ex3 equals 1 or is close to 1. In a similar manner, according to this embodiment of the invention, distribution of light intensity of the image may be close to an ideal status when a ratio of the light intensity $I_2$ of the exiting beam Ex2 to the light intensity $I_3$ of the exiting beam Ex3 equals 1 or is close to 1.

More specifically, in this embodiment of the invention, the image beam IL may be polarized light or non-polarized light. The characteristics of transmittance (as the above-mentioned T1 to T3) or reflectivity (as the above-mentioned R1 to R3) of the light-splitting layers 122 may be the characteristics of transmittance or reflectivity for the polarized light or non-polarized light. The invention is not limited to the above.

In other embodiments of the invention, when the number of the light-transmitting structures 124 is n, the beam combiner 120 satisfies T1>T2>T3> . . . >Tn and R1<R2<R3< . . . <Rn. Furthermore, distribution of light intensity of the image may be close to an ideal status when $I_1 \cong I_2 \cong I_3 \cong \ldots \cong I_n$ and $I_n = (T1) \times (T2) \times \ldots \times (Tn-1) \times (Rn) \times (Tn-1) \times \ldots \times (T2) \times (T1)$. In the above-mentioned embodiment, T1 is the light transmittance of the first light-splitting layer 122a, T2 is the light transmittance of the second light-splitting layer 122b, R2 is the light reflectivity of the second light-splitting layer 122b, T3 is the light transmittance of the third light-splitting layer 122c, and R3 is the light reflectivity of the third light-splitting layer 122c. Tn is the light transmittance of the $n^{th}$ light-splitting layer (not depicted here), and Rn is the light reflectivity of the $n^{th}$ light-splitting layer (not depicted here). $I_1$ is the light intensity of the first exiting beam Ex1, $I_2$ is the light intensity of the second exiting beam Ex2, $I_3$ is the light intensity of the third exiting beam Ex3, and $I_n$ is the light intensity of the $n^{th}$ exiting beam (not depicted here). Nevertheless, the invention is not limited to the above.

Referring to FIG. 1A and FIG. 1B again, in this embodiment of the invention, the environmental beam AL from the outside of the HMD device 100 is configured to pass through the light-splitting layers 122. In this embodiment of the invention, the environmental beam AL sequentially passes through the light-splitting layers 122 along a direction, for example, from the second light-splitting layer 122b to the first light-splitting layer 122a. The environmental beam AL passing through the light-splitting layers 122 may enter a user's eyes. That is to say, in this embodiment of the invention, the beam combiner 120 may be used to combine the image beam IL with the environmental beam AL and provide the image beam RL and the environmental beam AL to the user's eyes. In this embodiment of the invention, when the HMD device 100 is placed in front of the user's eyes, and when the image beam RL and the environmental beam AL enter the user's eyes, the user may observe an image (not depicted here) corresponding to the image beam RL. That is to say, the user may simultaneously observe an external image (not depicted here) corresponding to the environmental beam AL and the image (not depicted here) corresponding to the image beam RL. Thereby, the display effects of AR, VR, or mixed reality (MR) may be achieved.

In this embodiment of the invention, the image beam RL exiting the beam combiner 120 is expanded, such that the HMD device 100 has a larger observation area OA. For example, the observation area OA may be expanded to more than 9.4 mm$^2$. Thereby, in a normal using condition, a user's pupils may easily be located in the observation area OA without using any other adjusting apparatuses for positioning the pupils in the observation area. As a result, the adjusting apparatuses may be omitted from the HMD device 100, so as to reduce the volume and the weight of the HMD device 100 and save the user's time on operating the adjusting apparatuses. The HMD device 100 thus has the advantages of usage convenience and compactness. Moreover, in the conventional HMD device, the light diffuser is required to be disposed at a location of the intermediate image IM, so as to expand the image beam. In this embodiment of the invention, however, the HMD device 100 may expand the image beam IL through the beam combiner 120 and does not need a light diffuser for expanding the image beam IL. That is to say, in this embodiment of the invention, the image beam AL is expanded after the image beam IL travels to the beam combiner 120. Thereby, the HMD device 100 may have the simple design, and optical devices arranged together with the light diffuser may be omitted. Thereby, difficulty in designing the HMD device 100 is lowered, and mass production of the HMD device 100 is made easier.

More specifically, in this embodiment of the invention, the number of the light-splitting layers 122 included in the beam combiner 120 is 3. In some embodiments, however, the beam combiner 120 may have different numbers of the light-splitting layers 122, and the invention is not limited to the above. More specifically, in some embodiments, favorable evenness of the distribution of the light intensity of the image beam IL may be guaranteed when the number of the light-splitting layers 122 is greater than 2 and is less than or equal to 5, and difficulty in and complicity of manufacturing the light-splitting layers 122 are not overly high. Hence, the HMD device 100 not only achieves the aforementioned technical effects but also has excellent cost effectiveness.

Figure 3:
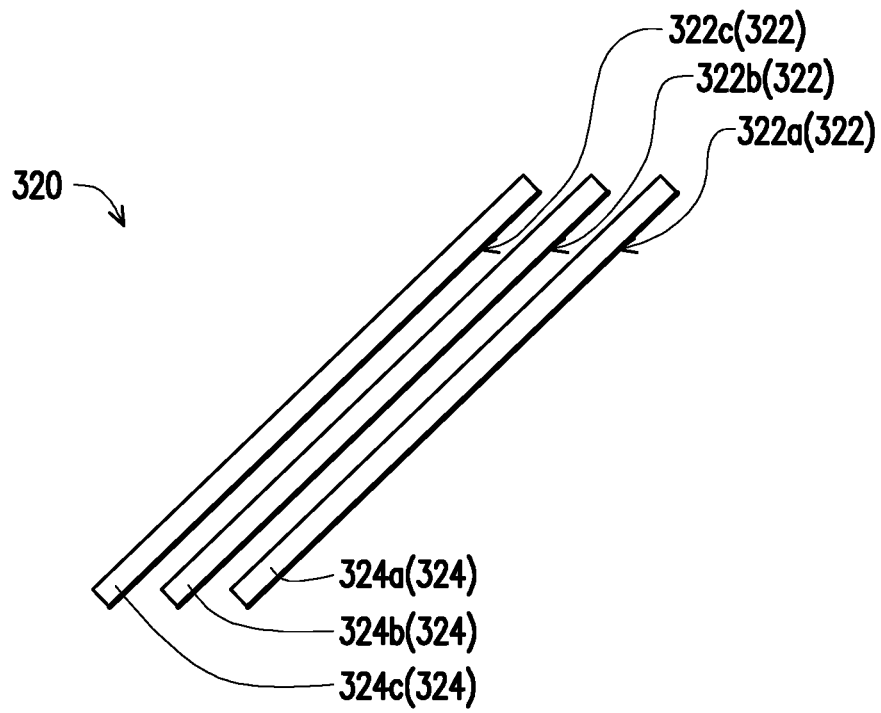
FIG. 3 is a schematic view briefly illustrating a beam combiner according to another embodiment of the invention.

FIG. 3 is a schematic view briefly illustrating a beam combiner according to another embodiment of the invention. Referring to FIG. 3, in this embodiment of the invention, a beam combiner 320 is similar to the beam combiner 120 in FIG. 1A to FIG. 2. For the components and the related descriptions of the beam combiner 320, please refer to those of the beam combiner 120 in FIG. 1A to FIG. 2, which will not be repeated here. Differences between the beam combiner 320 and the beam combiner 120 are as follows. In this embodiment of the invention, the beam combiner 320 includes a plurality of light-splitting layers 322 and a plurality of light-transmitting structures 324. In this embodiment of the invention, a portion of the light-splitting layers 322 is interposed between two adjacent light-transmitting structures 324. The portion of the light-splitting layers 322 is connected to one of the two adjacent light-transmitting structures 324 and is separated from the other of the two adjacent light-transmitting structures 324. More specifically, in this embodiment of the invention, the light-splitting layers 322 include a first light-splitting layer 322a, a second light-splitting layer 322b, and a third light-splitting layer 322c. The light-transmitting structures 324 include a first light-transmitting structure 324a, a second light-transmitting structure 324b, and a third light-transmitting structure 324c. In this embodiment of the invention, the second light-splitting layer 322b is interposed between the adjacent first and second light-transmitting structures 324a and 324b, and the third light-splitting layer 322c is interposed between the adjacent second and third light-transmitting structures 324b and 324c. In this embodiment of the invention, the second light-splitting layer 322b is connected to the second light-transmitting structure 324b and is separated from the first light-transmitting structure 324a. In this embodiment of the invention, the third light-splitting layer 322c is connected to the third light-transmitting structure 324c and is separated from the second light-transmitting structure 324b. More specifically, the HMD device adopting the beam combiner 320 in this embodiment may at least achieve the effects accomplished by the HMD device 100 in the embodiments in FIG. 1A to FIG. 2, the HMD device adopting the beam combiner 320 in this embodiment has advantages of usage convenience and compactness, difficulty in designing the HMD device is lowered, and mass production of the HMD device is made easier.

More specifically, in some embodiments that are not shown in the drawings, a plurality of light-splitting layers may be disposed between two adjacent light-transmitting structures. Alternatively, there may be no light-splitting layer disposed between two adjacent light-transmitting structures. Locations of the light-splitting layers and the light-transmitting structures are not limited, and nor are the numbers of the light-splitting layers and the light-transmitting structures. Additionally, in some of the embodiments not depicted in the drawings, two light-splitting layers may be respectively disposed on two opposite surfaces of the first light-transmitting structures 324a. That is to say, the first light-splitting layer 322a is disposed on one of the surfaces, while another light-splitting layer is disposed on the other surface. In a similar manner, in some of the embodiments not shown in the drawings, two light-splitting layers may be respectively disposed on two opposite surfaces of the second light-transmitting structure 324b. That is to say, the second light-splitting layer 322b is disposed on one of the surfaces, while another light-splitting layer is disposed on the other surface. In a similar manner, in some of the embodiments not shown in the drawings, two light-splitting layers may be respectively disposed on two opposite surfaces of the third light-transmitting structure 324c. That is to say, the third light-splitting layer 322c is disposed on one of the surfaces, while another light-splitting layer is disposed on the other surface. Note that the invention is not limited to the above-mentioned embodiments.

Figure 4:
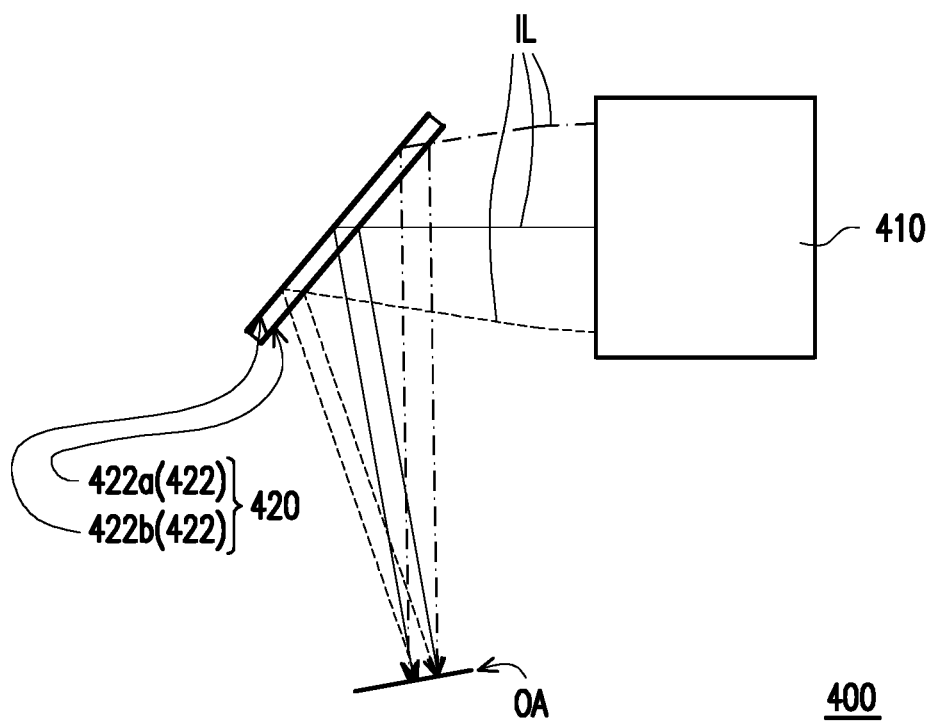
FIG. 4 is a schematic view briefly illustrating a HMD device according to yet another embodiment of the invention.

FIG. 4 is a schematic view briefly illustrating a HMD device according to yet another embodiment of the invention. Referring to FIG. 4, more specifically, teaching, suggestions, and descriptions on how to implement a HMD device 400 in this embodiment are sufficiently provided in the embodiments shown in FIG. 1A to FIG. 3 and thus are not repeated hereinafter. In this embodiment of the invention, the HMD device 400 includes a display 410 and a beam combiner 420. The display 410 is configured to emit an image beam IL. The beam combiner 420 includes a plurality of stacked light-splitting layers 422, which include a first light-splitting layer 422a and a second light-splitting layer 422b. The image beam IL is configured to enter and exit the beam combiner 420 through the first light-splitting layer 422a. The first light-splitting layer 422a is located between the second light-splitting layer 422b and the display 410. The second light-splitting layer 422b is closest to the first light-splitting layer 422a. Moreover, the beam combiner 420 satisfies $0.7 \leq R1/(T1 \times R2 \times T1) \leq 1.3$, wherein R1 is light reflectivity of the first light-splitting layer 422a, T1 is light transmittance of the first light-splitting layer 422a, and R2 is light reflectivity of the second light-splitting layer 422b. In this embodiment of the invention, the first light-splitting layer 422a and the second light-splitting layer 422b are located, for example, on two opposite sides of one light-transmitting structure, which should however not be construed as a limitation to the invention. In other embodiments not shown in the drawings, there may be no light-transmitting structure interposed between the first light-splitting layer 422a and the second light-splitting layer 422b, and the invention is not limited to the above.

To sum up, the embodiments of the invention have at least one of the following advantages or achieve one of the following effects. In the aforementioned embodiments of the invention, the beam combiner of the HMD device includes a plurality of stacked light-splitting layers. The light-splitting layers include the first light-splitting layer and a second light-splitting layer closest to the first light-splitting layer. The image beam emitted by the display is configured to enter and exit the beam combiner through the first light-splitting layer. In the embodiments of the invention, the light reflectivity and the light transmittance of the light-splitting layers are properly designed, such that the image beam exiting the beam combiner is expanded, and that the HMD device has a larger observation area. In the embodiments of the invention, a user's pupils may easily be located in the observation area without employing any other adjusting apparatuses for positioning the pupils in the observation area. Hence, the HMD device has the advantages of usage convenience and compactness. Moreover, since the HMD device in the embodiments of the invention does not need to expand the image beam through a light diffuser, the difficulty in designing the HMD device is lowered, and mass production of the HMD device is made easily.

The foregoing description of the preferred embodiments of the invention has been presented for illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-mounted display device comprising:
    a display configured to emit an image beam; and
    a beam combiner comprising a plurality of stacked light-splitting layers, wherein the light-splitting layers comprise a first light-splitting layer and a second light-splitting layer, the image beam is configured to enter and exit the beam combiner through the first light-splitting layer, the first light-splitting layer is located between the second light-splitting layer and the display, the second light-splitting layer is located closest to the first light-splitting layer, and the beam combiner satisfies:

$$0.7 \leq R1/(T1 \times R2 \times T1) \leq 1.3,$$

wherein R1 is light reflectivity of the first light-splitting layer, T1 is a light transmittance of the first light-splitting layer, and R2 is light reflectivity of the second light-splitting layer.

2. The head-mounted display device of claim 1, wherein the light-splitting layers are arranged parallel to each other, and the image beam entering the beam combiner is configured to be sequentially incident on the light-splitting layers, and the light-splitting layers are respectively configured to reflect a portion of the image beam to form a plurality of reflective beams parallel to each other.

3. The head-mounted display device of claim 1, wherein the beam combiner comprises a light-transmitting structure, and the first light-splitting layer and the second light-splitting layer are respectively located on two opposite sides of the light-transmitting structure.

4. The head-mounted display device of claim 1, wherein the beam combiner comprises a plurality of stacked light-transmitting structures, and a portion of the light-splitting layers is interposed between two adjacent light-transmitting structures and is connected to the two adjacent light-transmitting structures.

5. The head-mounted display device of claim 1, wherein the beam combiner comprises a plurality of stacked light-transmitting structures, a portion of the light-splitting layers is interposed between two adjacent light-transmitting structures, and a portion of the light-splitting layers is connected to one of the two adjacent light-transmitting structures and is separated from the other of the two adjacent light-transmitting structures.

6. The head-mounted display device of claim 1, wherein an angle of incidence of the image beam incident on the first light-splitting layer is larger than 0 degree and smaller than 90 degrees.

7. The head-mounted display device of claim 1, wherein R1 falls within a range from 3% to 17%.

8. The head-mounted display device of claim 1, wherein an environmental beam is configured to pass the light-splitting layers.

9. The head-mounted display device of claim 1, wherein the display comprises a light source module, a reflective device, and an optical adjusting module, the light source module is configured to provide an illuminating beam, the reflective device is located on a propagation path of the illuminating beam from the light source module, the reflective device is configured to convert the illuminating beam to the image beam and provide the image beam to the optical adjusting module, and the beam combiner is located on a propagation path of the image beam from the optical adjusting module.

10. The head-mounted display device of claim 9, wherein the optical adjusting module comprises a first lens set and a second lens set, the first lens set is located between the second lens set and the reflective device, the first lens set is located on a propagation path of the image beam from the reflective device, so as to converge the image beam into an intermediate image, the intermediate image is located between the first lens set and the second lens set, the second lens set is located on a propagation path of the image beam from the first lens set, and the beam combiner is located on a propagation path of the image beam from the second lens set.

* * * * *